Figure 1:
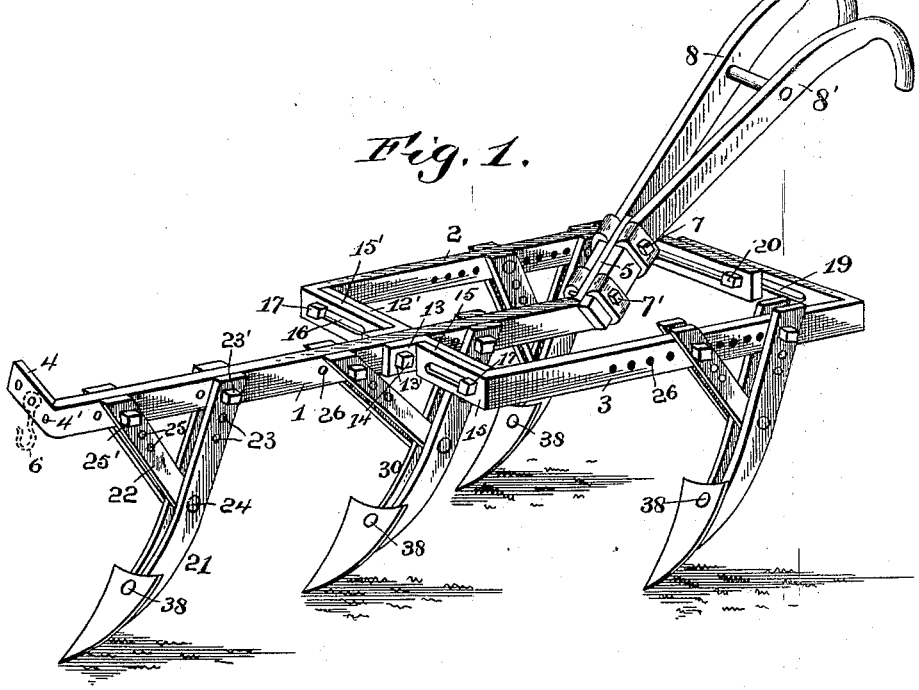
Figure 2:
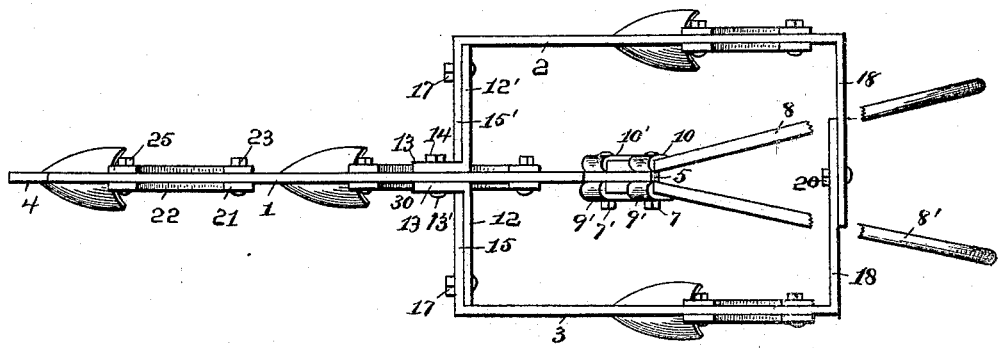

(No Model.)  S. W. HATCHER.  2 Sheets—Sheet 1.
PLOW.

No. 431,891.  Patented July 8, 1890.

Witnesses:  Inventor:
Sidney W. Hatcher
By his Attorneys
Edson Bros.

THE NORRIS PETERS CO., PHOTO-LITHO., WASHINGTON, D. C.

(No Model.) 2 Sheets—Sheet 2.
S. W. HATCHER.
PLOW.
No. 431,891. Patented July 8, 1890.
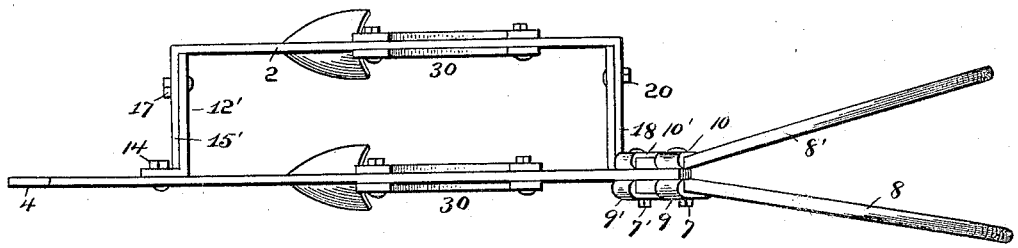
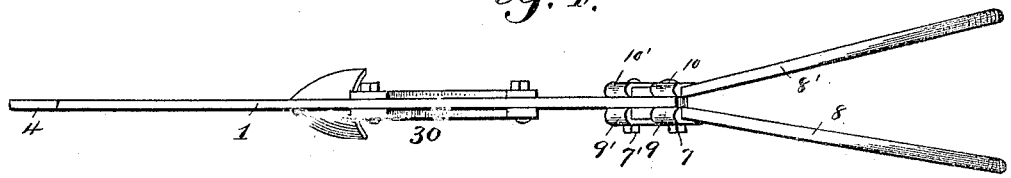
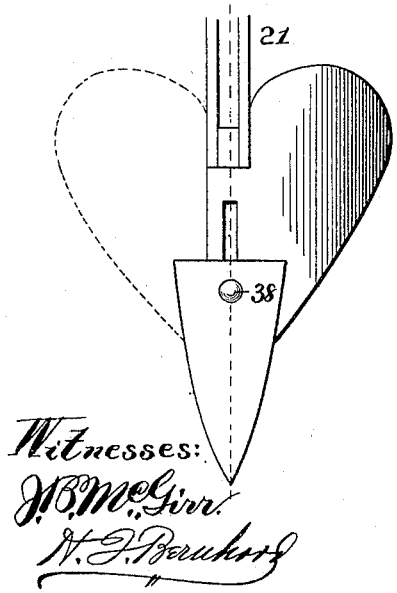
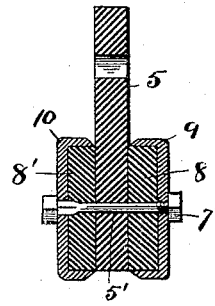
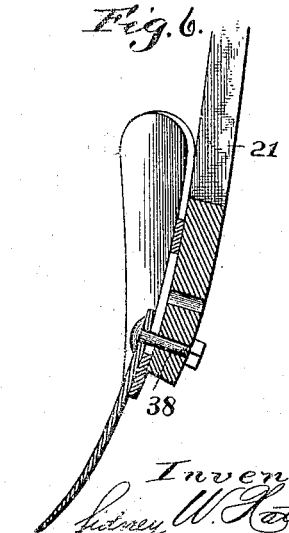
Witnesses:
Inventor
Sidney W. Hatcher

UNITED STATES PATENT OFFICE.

SIDNEY W. HATCHER, OF CERES, GEORGIA.

PLOW.

SPECIFICATION forming part of Letters Patent No. 431,891, dated July 8, 1890.

Application filed March 12, 1890. Serial No. 343,574. (No model.)

*To all whom it may concern:*

Be it known that I, SIDNEY W. HATCHER, a citizen of the United States, and a resident of Ceres, in the county of Crawford and State of Georgia, have invented certain new and useful Improvements in Plows; and I do hereby declare the following to be a full, clear, and exact description of the invention, such as will enable others skilled in the art to which it appertains to make and use the same.

My invention relates to improvements in plows; and among other things my invention has for its object, first, to provide an improved implement which as an entirety is light in weight, (in fact I have found that it weighs less than one-half of the weight of an ordinary plow of this class,) is strong, durable, cheap, adjustable for work of different kinds, more convenient and easier handled than an ordinary plow, and has less draft.

My invention has further for its object to provide a plow which can be adjusted or converted into a double, triple, or single plow, according to the work to be performed, thus adapting the implement for the various different uses to which a plow can be put.

A further object of my invention is to enable the implement to be adjusted to rows of different widths and to enable the stocks and feet of the implement to be adjusted both vertically and longitudinally of the implement.

A further object of my invention is to provide an improved adjustable mold-board which can be adjusted to turn more or less dirt, and thus obviate the use of mold-boards of varying sizes, which is the common practice, and which can be used in connection with any ordinary plow-blade, which blade can be resharpened when worn.

With these and other ends in view my invention consists in the combination of devices and novel construction and arrangements of parts, as will be hereinafter fully described and claimed.

To enable others to understand my invention, I will now proceed to a detailed description thereof in connection with the accompanying drawings, in which—

Figure I is a perspective view of my improved plow, showing it adjusted and adapted for use as a triple plow. Fig. II is a plan view of the implement shown in Fig. I. Fig. III is a view of the implement adjusted as a double plow. Fig. IV is a view showing the device as a single plow. Figs. V and VI are views in side elevation and section, respectively, of the mold-board. Fig. VII is a detail view showing the manner of connecting the handles to the longitudinal or main beam of the implement.

Referring to the drawings, in which like numerals of reference denote corresponding parts in all the figures, 1 designates the main longitudinal beam of the plow, and 2 3 the removable side beams, which are united to the main beam and to each other in the manner which will be presently described to form the frame of the plow when the same is used as a triple plow, one or both of said side bars being removable to form the double or single plow, respectively.

The main longitudinal beam of the plow consists of a straight flat bar of metal, the ends of which are bent or turned up at an angle to form the inclined arms 4 5, respectively, at the front and rear ends of said beam. The inclined arm 4 at the front of the main longitudinal beam is perforated, as at 4', to receive the clevis 6, by which the draft-animal is hitched to the implement, and the inclined arm 5 at the rear end of the main plow-beam has two transverse apertures 5' 5', through which bolts 7 7 are passed to secure the handles 8 8 to the main longitudinal beam of the implement. In order to prevent the bolts from working into the wood of the handles and to obviate detachment of the bolts and the nuts thereof, I provide the handles with cuffs 9 9' and 10 10', respectively, one of the cuffs of each pair having square or angular sockets, through which the squared parts of the bolts pass, so that the bolts are prevented from turning axially within the cuffs, as will be readily understood.

The removable side bars of the plow 2 3 are arranged parallel with each other and on opposite sides of the longitudinal main beam 1 of the implement, and these side bars are connected at their front ends to the main beam 1 and at their rear ends to each other. The connection of the front ends of the sides with the main beam is effected by means of slotted bars 12 12', which bars are provided with lips 13, which are perforated and have their perforations aligned with a single perforation 13' in the main beam 1, and through the perforations in the lips of the slotted connecting-bars and the main beam is passed a single through-bolt 14, which unites both side bars 2 3 to the main beam 1. The side bars 2 3 of the implement are provided at their front ends with arms 15 15, which lap the connecting-bars 12 12, and through these arms and the bars 12 are formed longitudinal slots 16, through which are passed adjusting-bolts 17, whereby the side bars and the connecting-bars are adjustably connected together, so that the side bars 2 3 can be moved or adjusted laterally with relation to each other to vary the width of the implement without affecting the connection of the bars 12 with the main beam. The rear ends of the side bars 2 3 are provided with the arms 18, which extend inward toward each other and overlap, as shown, and in one of these arms is formed a longitudinal slot 19, through which passes a connecting-bolt 20, so that the arms at the rear ends of the side bars 2 3 can be adjustably connected together.

It will be observed that the side bars 2 3 of the implement can be moved nearer to or farther from each other by simply loosening the bolts and moving the bars and that they can be arranged or maintained parallel with each other to adapt the implement for use on furrows of varying widths. The side bars 2 3 can also be wholly removed from the main beam 1, or either of the side bars can be removed—that is, the one on the right of beam can be removed or the one on the left of the machine, so that the implement can be converted into a double plow or into a single plow.

The main beam 1 of the plow carries one or two depending stocks 21, one stock being located at or near the middle of said beam, while the other stock is situated near or at the rear end of the same. Each stock is curved in the direction of its length, so that its lower end lies forward of the point of attachment of the stock to the beam, and the stock is braced against undue strain by means of a curved arm or rod 22 intermediate of the foot and the beam. The stock is provided with a series of apertures 23, through one of which is passed the bolt 23', that connects said stock to the beam, and the lower end of the brace-rod is pivoted to the stock by a bolt 24, while the upper end of the brace-rod is provided with a series of apertures 25, through one of which is passed a bolt 25', for adjustably connecting the brace-rod to the beam. The beam 1 is provided at intermediate points of its length with apertures 26 to enable the plow-stock to be adjusted longitudinally on the beam, and it will thus be seen that the stocks are each adjustable both vertically on the beam at an angle thereto and longitudinally on the same.

Each of the side bars 2 3 of the implement carries a depending plow-stock 30, which is constructed in the same manner as the stock 21, so as to be adjustable vertically on the beam and at an angle thereto, and each side bar of the implement is provided at intermediate points of its length with a series of apertures 26, whereby the plow-stock on each side bar can be adjusted longitudinally of said bars to adapt the plow-stocks to be used on the side bars at the same or varying distances from the end of the main beam, or, in other words, to enable the stock on one side bar to be used in advance of the stock on the adjacent side bar of the implement.

As hereinbefore stated, the implement can be converted into a single plow, as in Fig. IV of the drawings, or used as a double plow, as in Fig. III, or as a triple plow, as in Figs. I and II. When the device is used as a triple plow, I use the two side bars 2 3 and the main longitudinal beam 1, each side bar having a plow-stock and the main beam having one or two stocks, as is obvious. To convert the implement into a double plow, one of the side bars and its attached plow-stock is removed by taking out the bolts to detach the desired bar, whether it is on the right or left hand side of the main beam, after which the bolts are replaced in order to secure the remaining side bar to the main beam. To convert the device into a single plow, both of the side bars are removed, and as the handles are attached to the rear end of the longitudinal beam 1 it is obvious that this conversion of the implement can be readily and easily accomplished without disarranging the parts of the implement or affecting the parts so that they cannot be readily restored.

In Figs. V and VI of the drawings I have shown my improved mold-board, which is equally adapted for use on the foot or stock of the main longitudinal beam or one or both of the side bars. This mold-board is given the desired configuration and shape to adapt it for its use in turning the soil and dirt, and at or near its lower end said mold-board is provided with a slot, and a blade having a single perforation overlaps the lower part of the mold-board and is so arranged that its aperture aligns with the slot in the mold-board, whereby the mold-board and the plow-blade are connected to the foot or stock by a single bolt 38, which passes through the aperture in the plow-blade, the slot in the mold-board, and the foot or stock. (See Fig. VI.) I attach importance to the mold-board having the longitudinal slot, as I am thereby enabled to turn the soil and dirt more or less. Thus by moving the mold-board up on the plow-foot the mold-board is caused to throw over less of the soil; but by depressing or lowering the mold-board it will throw more of the soil.

With a mold-board constructed as herein described I am enabled to use any kind of a plow-blade which can be readily removed and sharpened when it becomes dull through use, which is advantageous, as it enables me to use the blade for a longer period of time than can be done with the ordinary cast metal plow-point, which soon becomes dulled and the plow has to be set or adjusted to dig up the ground. By using the curved foot and brace-rod and the plow-blade, as herein shown and described, I am enabled to adjust the parts so that they will cut through the soil instead of digging, as in the ordinary plow, which lessens the draft on the animal, and the implement as an entirety can be made very much lighter in weight. In fact, the entire implement weighs less than one-half of the plow of this kind.

When the implement is used as a subsoil-plow, the turning attachment or mold-board can be used on the front plow-foot; but by dispensing with the subsoil attachment the mold-board can be used as a straight-out turning-plow. When the right foot of the double plow is detached, the plow can be made to run with two feet, one ahead of the other, which lessens the labor in breaking and preparing the landing or in cultivating crops.

The implement can also be used with three stocks or feet, the rear foot on the main beam being adapted to lay off or open the soil and the two rear feet to ridge and make a bed of two furrows, either in rows for corn, cotton, or other crops.

It is obvious that a left-hand mold-board can be used in addition to the right-hand mold-board, in which event the mold-board is shaped to adapt it to its use in its proper position.

The operation and advantages of my invention will be readily understood and appreciated by those skilled in the art to which it relates from the foregoing description, taken in connection with the drawings.

I am aware that changes and modifications in the form and proportion of parts and details of construction can be made without departing from the spirit or sacrificing the advantages of my invention, and I therefore reserve the right to make such modifications as fairly fall within the scope of my invention.

In the front elevation, Fig. 7, of the drawings, I have shown a plow-stock provided with a left-hand mold-board, which is shown by full lines, and in dotted lines a right-hand mold-board is shown, which can be used in lieu of the left-hand mold-board. As an opening-plow for planting and putting in fertilizer, the plow is of great utility to the farmer. It is evident the mold-board can be adjusted to make any kind of furrow desired, and that any kind of plow-blade can be used to work with the mold-board.

Having thus fully described my invention, what I claim as new, and desire to secure by Letters Patent, is—

1. In a plow, the combination of a central longitudinal beam and the side bars arranged on opposite sides of said beam and connected at their front ends to the beam and detachably connected together at their rear ends, for the purpose described, substantially as set forth.

2. In a plow, the combination of a central longitudinal beam having the handles connected to the rear end thereof and the side bars connected at their front ends to the beam and having the inwardly-extending arms at their rear ends, which arms overlap each other and are adjustably connected together, the rear end of the beam terminating in front of the inwardly-extending arms of the side bars, as and for the purpose described.

3. In a plow, the combination of a central longitudinal beam, the flanged slotted bars secured to opposite sides of said beam by through-bolts, and the side bars having the right-angled arms at the front ends, which are adjustably secured by bolts to the slotted bars, the rear ends of said side bars having the inwardly-extending arms, which are adjustably and detachably secured together, as and for the purpose described.

In testimony whereof I affix my signature in presence of two witnesses.

SIDNEY W. HATCHER.

Witnesses:
F. COLBERT,
T. W. JACKSON.